United States Patent [19]

Taylor

[11] 4,136,257
[45] Jan. 23, 1979

[54] WIRE DUCT WITH WIRE RETAINING CLIP

[76] Inventor: Philip W. Taylor, Rte. No. 1, Box 112A, Burnet, Tex. 78611

[21] Appl. No.: 882,415

[22] Filed: Mar. 1, 1978

[51] Int. Cl.² .................................................. H02G 3/04
[52] U.S. Cl. .................................. 174/68 C; 174/72 A; 248/68 R
[58] Field of Search ................... 174/68 C, 72 A, 101; 248/68 R; 361/428

[56]  References Cited

U.S. PATENT DOCUMENTS 3,705,949  12/1972  Weiss .................................. 174/101
3,890,459  6/1975  Caveney .............................. 174/101

Primary Examiner—Laramie E. Askin
Attorney, Agent, or Firm—Harness, Dickey & Pierce

[57] ABSTRACT

The disclosure relates to a wire duct having an adjustable clip for retaining wires within the duct thus improving the utility and efficiency of the duct.

11 Claims, 8 Drawing Figures

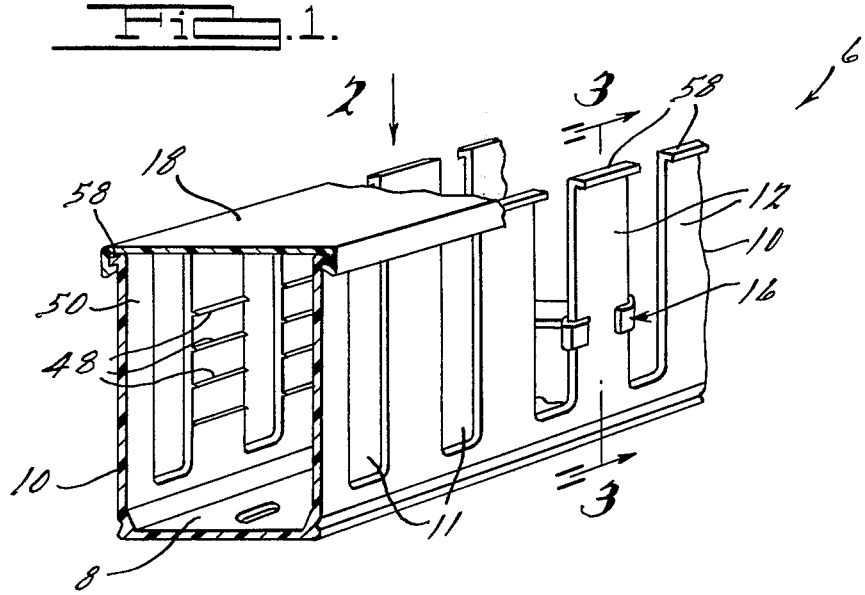
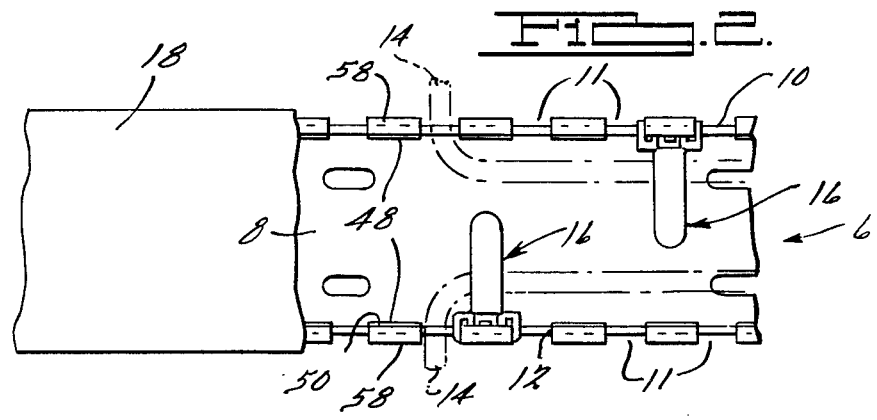
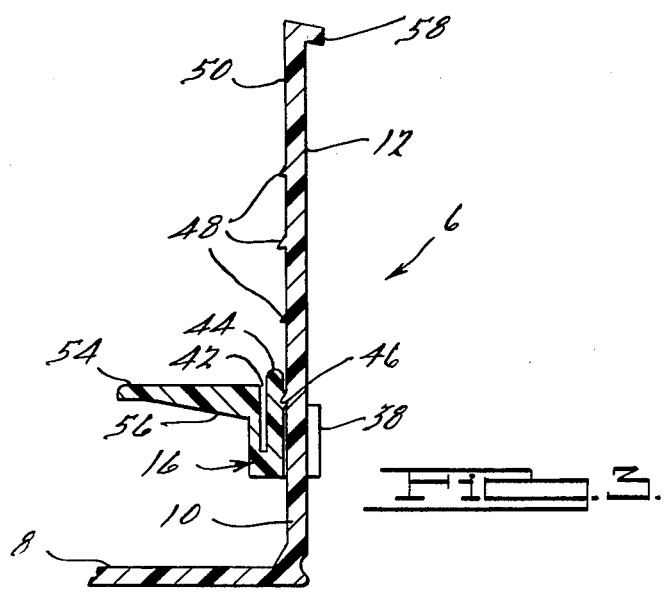

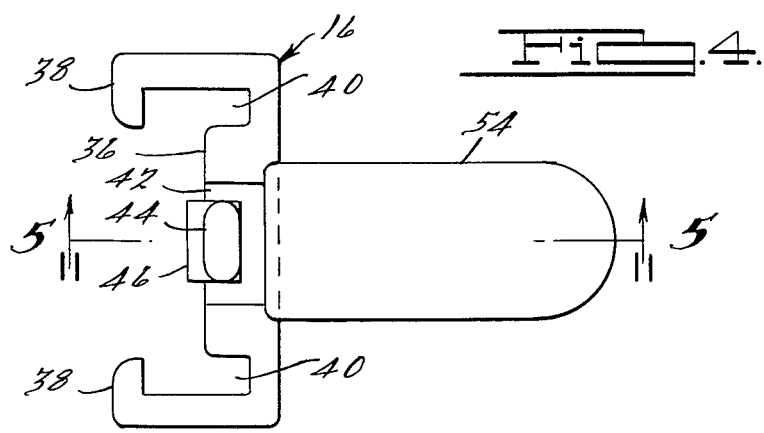
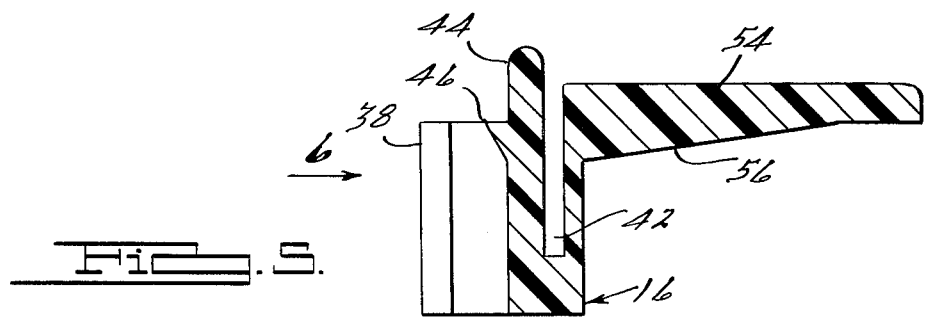
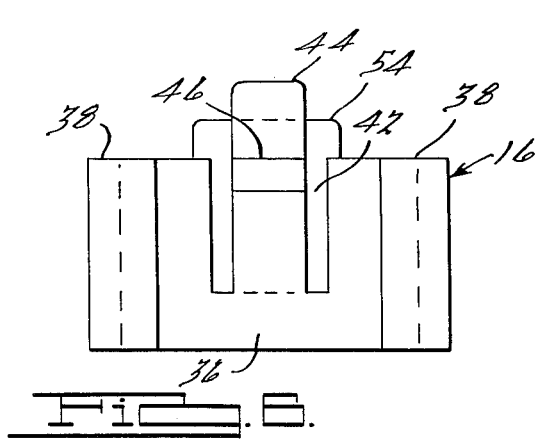
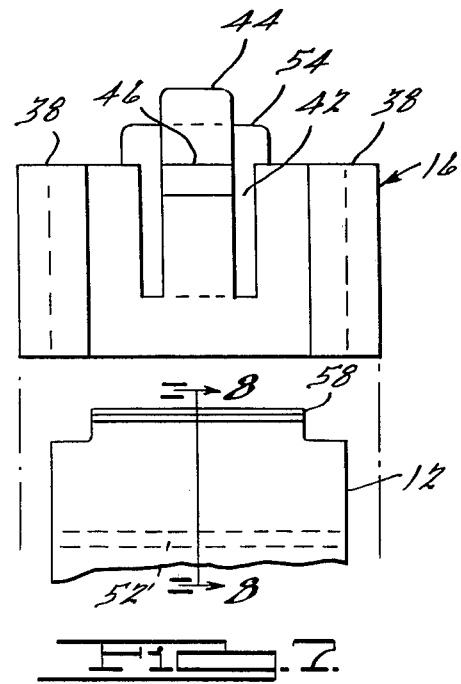
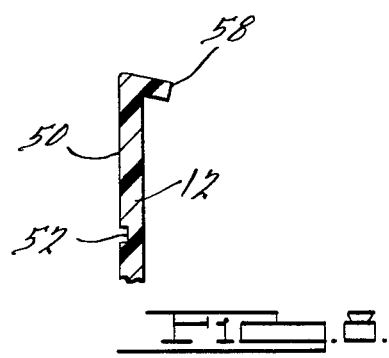

WIRE DUCT WITH WIRE RETAINING CLIP

BACKGROUND OF THE INVENTION

Wire ducts having auxiliary devices therein to retain the wires within the duct are taught in U.S. Pat. Nos. 3,890,459 and 3,705,949. However, such known devices either do not effectively retain the wires within the duct without a duct cover or require a duct design which is difficult to manufacture.

SUMMARY OF THE INVENTION

The invention relates to a wire duct having an improved retaining clip including improved means for securing the clip to the duct walls which facilitates attachment and positioning thereof.

BRIEF DESCRIPTION OF THE DRAWINGS

FIG. 1 is a broken perspective view of a wire duct in accordance with a constructual embodiment of the instant invention.

FIG. 2 is a top view taken in the direction of the arrow 2 of FIG. 1 with wires added to illustrate conventional wiring practice.

FIG. 3 is a cross-sectional view taken substantially along line 3—3 of FIG. 1.

FIG. 4 is a top view of the wiring duct retaining clip.

FIG. 5 is a cross-sectional view taken substantially along line 5—5 of FIG. 4.

FIG. 6 is a side view taken in the direction of the arrow 6 of FIG. 5.

FIG. 7 is a side view of clip and outer side wall of a modified duct before assembly.

FIG. 8 is a cross-sectional view taken substantially along line 8—8 of FIG. 7.

DESCRIPTION OF THE PREFERRED EMBODIMENTS

A U-shaped wire duct 6 comprises a bottom wall 8 and upstanding side walls 10 having a plurality of apertures 11 therein defining fingers 12. The apertures 11 between fingers 12 allow selected wires 14 to be extracted from the duct 6 at intervals therealong. Retaining clips 16 are attachable to the fingers 12 of the duct 6 to retain and position the wires 14 within the duct 6. The retaining clips 16 are similar in construction and only one retaining clip 16 will be described hereafter. The duct 6 may be provided with a cover 18, if desired.

In accordance with the present invention, each retaining clip 16 comprises a U-shaped portion 36 having shouldered or flanged leg portions 38 that are engageable with the other and edge faces of a finger 12 to hold the retaining clip 16 on the finger 12. A pair of recesses 40 in the bight of the U-shaped portion 36 allow the leg portions 38 to flex relative to one another so that the retaining clip 16 can be installed on the finger 12 without damaging either the finger 12 or the retaining clip 16.

A recess 42 is formed in the bight of the U-shaped portion 36 defining a lock member 44 having a dog 46 thereon. The dog 46 is engageable with a series of detents or ridges 48 on an inner face 50 of each finger 12 to position and secure the retaining clip 16 thereto. As seen in FIG. 8, the dog 46 is also compatible with detents in the form of a series of grooves 52 on the inner face 50 of the finger 12. The dog 46 on the lock member 44 is automatically engaged with the detents 48 or 52 and can be disengaged from the finger 12 by moving the lock member 44 away therefrom into the recess 42.

An arm 54 is attached to the U-shaped portion 36 of each retaining clip 16 to retain the wires 14 in the duct 6. The arm 54 of the retaining clip 16 is reinforced by a portion 56 which provides for controlled flexure of the arm 54 during installation of the wires 14 into the duct 6 and yet has sufficient memory to return to its normal position to retain the wires 14 within the duct 6. The length of the arm 54 is preferably equal to or greater than half the width of the duct 6 but less than the width of the duct 6.

The retaining clips 16 are engaged with the duct 6 by either sliding or snapping the legs 38 thereof about a finger 12, and thereafter positioning the retaining clip 16 at a desired location vertically of the finger 12. Thus, when a cover 18 is utilized with the duct 6, the retaining clip 16 may be engaged with a finger 12 notwithstanding the use of a cover retaining lip 58 on the walls 10 of the duct 6. Each retaining clip 16 is locked at a desired location on a finger 12 through interaction of the dog 46 on the locking member 44 thereof with a selected locking detent 48 on the inner face 50 of each finger 12. As discussed hereinbefore, locking may also be effected by substituting the grooves 52 for the ridges 48.

By attaching each retaining clip 16 to a single finger 12 rather than between two fingers, the retaining clip 16 is less likely to become detached when a finger 12 is bent or jarred during installation, addition, repair or rearrangement of wires 14 within the duct 6. The design of the retaining clip 16 maximizes versatility by providing for installation from either the top of a finger 12 or from the side of a finger 12. Moreover, the retaining clip 16 is compatible with a cover 18.

Effectiveness of the retaining clip 16 for the retention of varying quantities of wires 14 within the duct 6 is enhanced by the capability of being positioned and locked vertically of a finger 12. Additionally, the provision of a relatively simple unlocking mechanism facilitates installation, addition, repair or rearrangement of wires 14 within the duct 6, as well as extraction of wires 14 therefrom.

While it will be apparent that the invention herein disclosed is well calculated to achieve the methods and advantages as hereinabove set forth, it will be appreciated that the invention is susceptible to modification, variation and change without departing from the spirit thereof.

I claim:

1. A wire duct comprising an elongated U-shaped enclosure defined by a bight portion and spaced finger portions extending normally thereto and having first locking means on an inner face thereof, a retaining clip for the retention and positioning of wires within said wire duct, said retaining clip comprising a U-shaped body defined by a bight portion and spaced leg portions extending generally normally thereto with flanges at the ends thereof, the leg portions of the U-shaped body being engageable with a first pair of opposite faces on the finger portions of said duct, the flanges on the leg portions and the bight portion of the U-shaped body being engageable with a second pair of opposite faces on the finger portions of said duct normally related to the first pair of faces, an arm extending generally perpendicularly from the bight portion of said retaining clip and laterally of said duct for retaining and positioning said wires, and second locking means on the bight portion of said retaining clip engageable with said first locking means on the finger portions of said duct to position and retain said retaining clip at a selected spacing relative to the bight portion of said duct.

2. A wire duct in accordance with claim 1 wherein said retaining clip has a pair of recesses in the bight portion thereof situated along the lines of intersection of the plane of the bight portion and the planes of the leg portions of the U-shaped body to allow the leg portions to flex relative to the bight portion.

3. A wre duct in accordance with claim 1 wherein the second locking means on said retaining clip is movable relative to the bight portion thereof to facilitate unlocking of said retaining clip from the finger portions of said duct.

4. A wire duct in accordance with claim 1 wherein the first locking means on the finger portions of said duct comprises a series of spaced ridges on the inner face of each finger portion.

5. A wire duct in accordance with claim 1 wherein said first locking means on the finger portions of said duct comprises a series of spaced grooves on the inner face of each finger portion.

6. A wire duct in accordance with claim 1 wherein the second locking means on said retaining clip comprises a lock member formed within a recess in the bight portion of said retaining clip.

7. A wire duct in accordance with claim 6 wherein said second locking means on said retaining clip comprises a dog engageable with the first locking means on the finger portions of said duct.

8. A wire duct in accordance with claim 6 wherein the lock member on said retaining clip intersects and extends beyond the plane of the arm on said retaining clip to facilitate movement of the lock member relative to the bight portion of said retaining clip.

9. A wire duct in accordance with claim 1 wherein the arm on said retaining clip is reinforced by a portion extending between the bight portion of the U-shaped body and the arm of said retaining clip.

10. A wire duct in accordance with claim 1 wherein the arm on said retaining clip is capable of deflection to facilitate installation of wires in said duct.

11. A wire duct in accordance with claim 1 wherein the arm on said retaining clip has a length equal to or greater than half the width but less than the width of the bight portion of said duct to facilitate retention of wires in said duct.

* * * * *